UNITED STATES PATENT OFFICE.

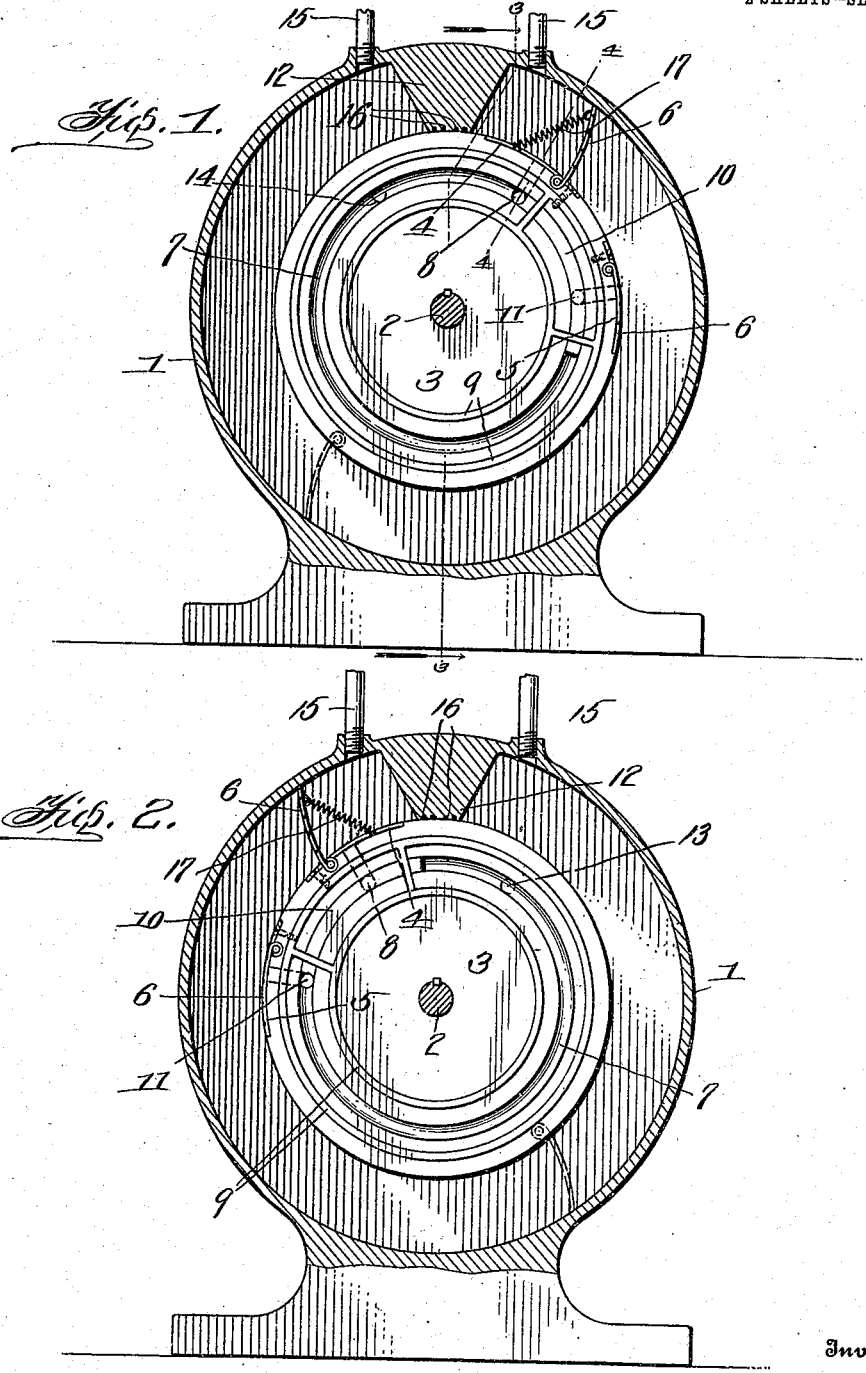

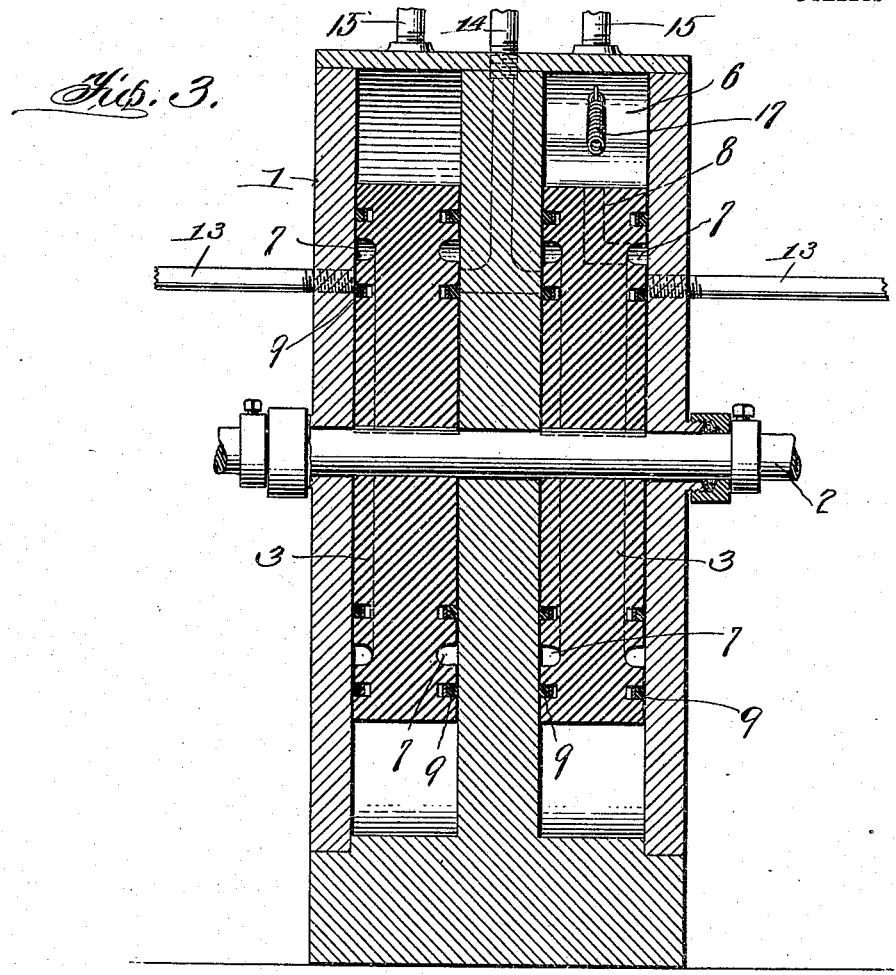
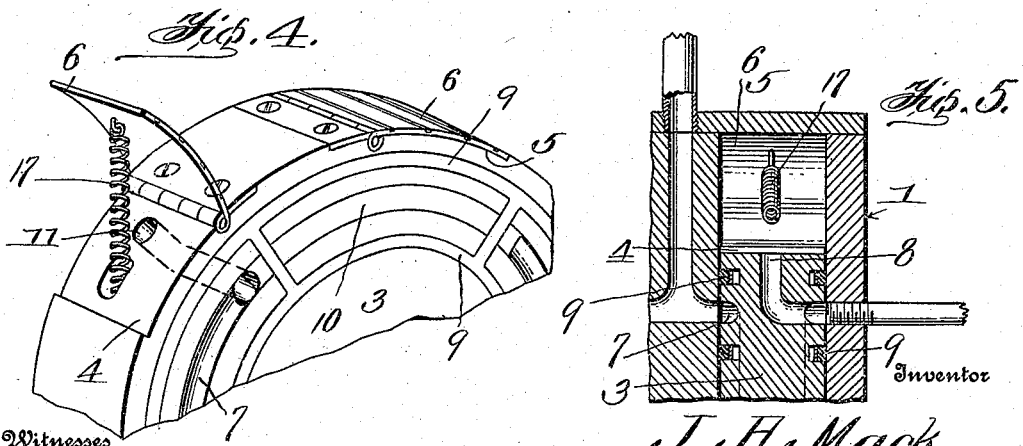

JOSEPH A. MACK, OF SALIDA, COLORADO.

ROTARY ENGINE.

939,609.     Specification of Letters Patent.     Patented Nov. 9, 1909.

Application filed November 27, 1908. Serial No. 464,679.

*To all whom it may concern:*

Be it known that I, JOSEPH A. MACK, a citizen of the United States, residing at Salida, in the county of Chaffee and State of Colorado, have invented a new and useful Improvement in Rotary Engines, of which the following is a specification.

This invention relates to a rotary engine, of that type in which steam acts expansively against foldable wings, said wings folding in order to pass along an abutment, and the object of the invention is to simplify engines of this type, to convey the steam through a groove and bore formed in the rotating piston, and to close the said bore by the wing when the same is folded.

My invention also comprises a rotary engine provided with oppositely arranged wings and steam inlet passages so that the engine can be reversed.

The invention consists in the novel features of construction hereinafter described, pointed out in the claims and shown in the accompanying drawings, in which, Figure 1 is a sectional view through the engine cylinder showing in elevation one side of the rotating piston, the piston being in position occupied at the commencement of one cycle. Fig. 2 is a similar view showing the other side of the rotating piston, and illustrating the method of reversing the engine. Fig. 3 is a section on the line 3—3 of Fig. 1. Fig. 4 is a perspective view of a portion of the periphery of one of the pistons, one wing being open. Fig. 5 is a detail radial sectional view through a portion of one of the pistons, at a point adjacent a wing, said wing being in open position.

In these drawings 1 represents a casing to which extends a shaft 2 and this casing is preferably divided by a suitable partition in two separate compartments each of which forms an engine cylinder and upon the shaft 2 in each of the cylinders thus formed is keyed a rotating piston 3. The periphery of this piston is slightly cut out as shown at 4 and 5 and wings 6 are hinged to fold in these cut out portions. The opposite sides of the pistons are provided with semi-circumferential steam grooves 7, and the end portion of the groove upon one side overlaps the groove upon the other side, the grooves being of the same size and length but displaced with respect to each other. The groove 7 upon one side, shown in Fig. 1 communicates at one end with an angled bore 8 which opens through the periphery of the piston in the cut out portion 4. This groove is paralleled upon both sides by packing rings 9 and packing strips 10 to prevent communication between the two end portions of the groove. The steam groove upon the opposite side of the piston, shown in Fig. 2, communicates with an angled bore 11 which opens through the periphery of the piston in the cut out portion 5. This side of the piston is also provided with packing rings 9 and packing strips 10. The wings 6 when closed cover respectively the outer ends of the bores 8 and 11.

The piston is of less diameter than the cylinder within which it rotates, and the periphery of the piston does not engage at any point the walls of the cylinder, and the piston is mounted concentric with the casing 1 and the shaft 2. The space between the piston and the circumference of the cylinder forms a steam chamber into which projects an abutment 12 provided with inclined sides and an inner face having the same curvature as the periphery of the piston. Steam is admitted into this space within the casing 1 by means of steam pipes 13 and 14 which open through the side walls or ends of the casing 1, and which discharge into the groove 7 respectively, it being understood that steam is admitted to only one of said pipes at a time. In a multiple engine having two or more pistons as shown by Fig. 3 it will be seen that these steam pipes are carried between the pistons and discharge steam through the partition or division of walls, and if each compartment be considered as a separate cylinder these walls will of course form the ends or heads of said cylinders.

Exhaust pipes 15 are arranged upon each side of the abutment 12, there being exhaust ports for each cylinder with the abutment between them. The packing rings and strips previously mentioned engage the ends or heads of the cylinder and I also provide packing strips 16 on the inner curved face of the abutment 12 to prevent leakage of steam along the periphery of the piston from one side of said abutment to the other.

With the above description of construction the operation of the engine will be readily understood. Steam being admitted through the steam pipe 13 steam will enter the groove 7 and will pass through the bore 8 lifting the wing 6 which folds into the cut out portion 4, and a steam chamber will be formed between said wing and the abutment 12, the expanding steam acting upon said wing will cause the piston to rotate, and steam will be admitted until the non-grooved portion of the piston is brought opposite the steam pipe 13. The supply of steam will then be cut off and the engine will be run by the further expansion of steam already admitted until the wing 6 has passed one of the exhaust pipes 15 when the wing will engage the abutment 12, will fold down, pass beneath said abutment, and reopen by a new supply of steam which will commence to enter when the inner end of the groove 7 again registers the pipe 13. The engine will thus be driven continuously in one direction. Should it be desired to reverse the engine steam is cut off from the pipe 13 and is admitted through the pipe 14, thus admitting steam to the other side of the piston and through the bore 11 to the wing folding into the cut out portion 5. This will cause reverse rotation of the piston, the operation being substantially the same as upon forward rotation. It will of course be understood that where a double cylinder is employed the two piston blades are off-set with respect to each other so that steam will be admitted to the wing of one blade at a time when it is cut off from the wing of the other blade. I also show a spring 17 connected to each wing 6 for the purpose of holding said wings in closed position when steam is not being admitted to them. These springs may be any desired type, and it will also be understood that any form of packing can be used and if desired the usual form of springs for bearing upon the packing.

What I claim is:—

1. In a rotary engine, a cylinder, a fixed abutment therein, a shaft passing through said cylinder, a rotatable piston concentric with said shaft, the periphery of the piston engaging the abutment, semi-annular overlapping grooves formed on opposite sides of said piston, bores leading from said grooves, and opening through the periphery of said piston, wings hinged to the piston and covering said bores when folded, and means for admitting steam to said grooves.

2. In a rotary engine, a cylinder, a shaft, a rotatable piston on the shaft, the periphery of the piston being provided with two cut out portions, wings hinged to the piston and folding in to said cut out portions, bores formed in the piston, said bores opening respectively into said cut out portions and opposite sides of the piston, and semi-annular grooves formed upon opposite sides of the piston, each of said grooves communicating at one end with one of said bores.

3. In a rotary engine, a cylinder, a rotatable piston, the opposite sides of said piston being provided with grooves, the groove upon one side over-lapping the groove upon the opposite side, annular packing rings arranged parallel to the grooves, packing strips separating opposite ends of each groove, an abutment carried by the cylinder, said abutment having a curved inner face, packing strips carried by said face, said strips being in engagement with the piston, bores formed in the piston, said bores communicating respectively with said grooves and opening through the periphery of the piston, wings hinged to the piston, said wings when closed folding over the said bores, exhaust pipes upon opposite sides of the abutment, and steam inlet pipes discharging into said grooves, as and for the purpose set forth.

JOSEPH A. MACK.

Witnesses:
C. S. KRAMER,
O. T. PARKER.